United States Patent [19]

Ikebe et al.

[11] Patent Number: 5,326,608
[45] Date of Patent: Jul. 5, 1994

[54] DISC CARTRIDGE

[75] Inventors: Masaru Ikebe, Saku; Haruo Shiba, Komoro; Yukio Miyazaki, Saku, all of Japan

[73] Assignee: TDK Corporation, Tokyo, Japan

[21] Appl. No.: 901,380

[22] Filed: Jun. 19, 1992

[30] Foreign Application Priority Data

Jun. 21, 1991 [JP] Japan .................................. 3-055227

[51] Int. Cl.$^5$ ............................................ G11B 23/033
[52] U.S. Cl. ........................................ 428/65; 428/76; 360/133; 206/444
[58] Field of Search ........................ 360/133; 369/291; 206/444; 428/65, 76

[56] References Cited

U.S. PATENT DOCUMENTS

| 4,682,257 | 7/1987 | Neuman | 360/133 |
| 5,006,948 | 4/1991 | Fukunaga | 360/133 |

FOREIGN PATENT DOCUMENTS 60-6942  3/1985  Japan .

Primary Examiner—Alexander S. Thomas
Attorney, Agent, or Firm—Price Gess & Ubell

[57] ABSTRACT

Elastic lifters arranged on an inner surface of a casing of a disc cartridge to act pressing force on a disc each are formed integral with the casing and into a plate-like shape in such a manner that a proximal end thereof is mounted on the casing and the a end thereof is rendered free. Such construction permits the pressing force to be kept constant for a long period of time and effectively prevents damage to the disc-like medium, to thereby substantially improve durability and reliability of the disc cartridge while significantly decreasing the number of parts, facilitating assembling of the disc cartridge and attains a decrease in manufacturing cost.

6 Claims, 4 Drawing Sheets

DISC CARTRIDGE

BACKGROUND OF THE INVENTION

This invention relates to a disc cartridge, and more particularly to a disc cartridge wherein a disc-like medium such as a magnetic disc, a floppy disc, a hard disc, a cleaning disc, an optical disc, a magneto-optical disc or the like is rotatably received in a casing.

Conventionally, a disc cartridge is generally constructed in such a manner that a disc-like medium such as a floppy disc, a compact disc, a video disc or the like which is used for a digital data storing unit, a video equipment or the like is rotatably received in a casing to prevent adhesion of dust thereto and damage thereto. Also, the conventional disc cartridge, as shown in FIG. 1, is so constructed so that the casing is provided on an inner surface thereof with an elastic lifter means 102 so as to exhibit an elastic force in a predetermined direction to pressedly contact sheet-like liners with the disc. In FIG. 1, the casing is designated at reference numeral 100.

In the conventional disc cartridge thus constructed, the lifter means 102 is formed and provided separate or independent from the casing 100. For example, tile lifter means is formed by bending a part of a metal plate at a mount portion of the inner surface of the casing or made of a film of a synthetic resin such as PET (polyethylene terephthalate) or the like. The metal plate is fixed on the casing by caulking and the PET film is fixed to the casing using a fixing means 104 such as a double-coated adhesive tape or the like.

Thus, tile casing 100 and lifter means 102 are formed separate from each other, to thereby increase the number of parts for the disc cartridge and renders assembling of the disc cartridge troublesome. Also, caulking or using of the fixing means 104 causes productivity of tile disc cartridge to be highly deteriorated to incur an increase in manufacturing cost. Further, use of a metal plate for the lifter means of which a distal end thereof forces the disc leads to damage to the disc, in particularly, due to any possible burr produced on the metal plate, to thereby fail to provide the disc cartridge with satisfactory durability and reliability; whereas use of synthetic resin such as PET for the lifter means leads to creep deformation of the lifter means sufficient to significantly decrease pressing force of the lifter means acting on the disc, resulting in the disc being deformed.

SUMMARY OF THE INVENTION

The present invention has been made in view of the foregoing disadvantages of the prior art.

Accordingly, it is an object of the present invention to provide a disc cartridge which is capable of significantly reducing the number of parts and facilitating the assembling to substantially decrease the manufacturing cost.

It is another object of the present invention to provide a disc cartridge which is capable of permitting a pressing force acting on a disc-like medium rotating to be kept constant for a long period of time.

It is a further object of the present invention to provide a disc cartridge which is capable of effectively preventing damage to the disc-like medium.

It is still another object of tile present invention to provide a disc cartridge which is capable of substantially improving tile durability and reliability.

In accordance with the present invention, a disc cartridge is provided. The disc cartridge includes a casing made of a synthetic resin material, a disc medium rotatably arranged in the casing and a lifter means arranged on an inner surface of the casing so as to press the disc medium. The lifter means is formed integral with the casing and into a plate-like shape in such a manner that a proximal end thereof is connected to the casing and a distal end thereof is rendered free.

In a preferred embodiment of the present invention, the casing and lifter means are formed of a polypropylene resin material.

In a preferred embodiment of tile present invention, the lifter means is formed by forming the lifter means so as to vertically extend from the inner surface of the casing during formation of the casing and then inclining the lifter means at a predetermined angle with respect to tile inner surface of the casing so as to permit tile distal end of the lifter means to be positioned in proximity to the inner surface of the casing.

In a preferred embodiment of the present invention, the casing is formed on the inner surface thereof with a level different portion in a manner to be recessed from the inner surface of the casing and the proximal end of the lifter means is mounted on the level different portion of the inner surface of the casing.

In a preferred embodiment of the present invention, the proximal end of the lifter means is formed on at least one of both sides thereof with a V-shape groove.

In a preferred embodiment of the present invention, the V-shaped groove is arranged in a width direction of the lifter means.

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENT

Figure 1:
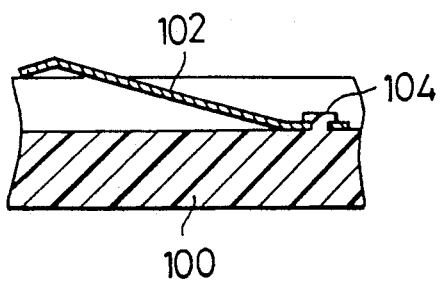
FIG. 1 is a fragmentary vertical sectional view showing a conventional lifter used in a disc cartridge.
Figure 2:
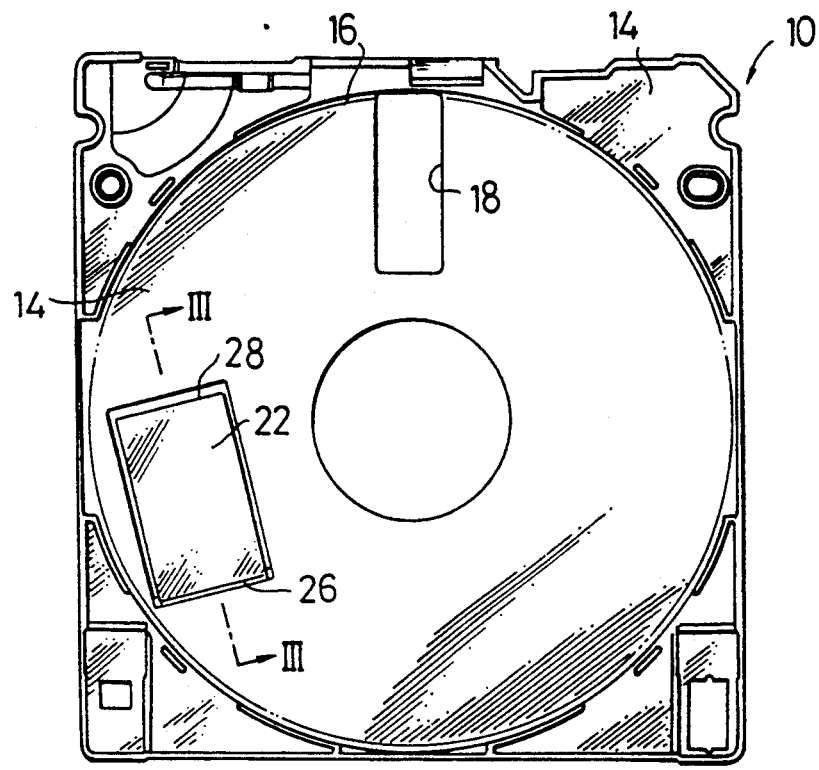
FIG. 2 is a plan view showing an embodiment of a disc cartridge according to the present invention wherein an upper casing member of a casing is removed for clarifying an essential part of the disc cartridge.

Now, a disc cartridge according to the present invention will be described hereinafter with reference to FIGS. 2 to 6 in which like reference numerals designate like parts throughout.

FIGS. 2 to 6 illustrate an embodiment of a disc cartridge according to the present invention. A disc cartridge of the illustrated embodiment is constructed in the form of a floppy disc. However, it is a matter of course that the present invention is not limited to such a floppy disc.

The disc cartridge of the illustrated embodiment generally includes a casing 10 which includes an upper casing member 12 and a lower casing member 14 and a record medium or disc 16 rotatably received or arranged in the casing 10. The upper and lower casing members 12 and 14 of the casing 10 each are formed with an aperture 18 through which a head of a recording and/or reproducing unit is inserted into the disc cartridge when the disc cartridge is charged in the unit. The disc cartridge also includes a shutter 20 slidably mounted on the casing so as to selectively cover or close the apertures 18.

In the disc cartridge of the illustrated embodiment generally constructed as described above, a lifter 22 is arranged on an inner surface of each of the upper and lower casing members 12 and 14 of the casing 10. The lifter 22 is formed so as to exhibit an elastic force in a predetermined direction, resulting in each of sheet-like liners 24 arranged between the disc 16 and the upper and lower casing members 12 and 14 being pressedly contacted with or biased against the disc 16.

The lifters 22 each are formed integral with the casing 10. More particularly, when the casing 12 is formed of a synthetic resin material such as polypropylene or the like, the lifters 22 each are formed integral with the casing 10 and into a plate-like shape in such a manner that a proximal end 26 thereof is connected to the casing 10 and a distal end 28 thereof is rendered free.

The lifters 22 each are initially formed in a manner to vertically extend from the inner surface of the casing 10 during formation of the casing 10 and then inclined or cantilevered at a predetermined inclination angle with respect to time inner surface of the casing 10 in post-forming so that the distal or free end 28 of the lifter 22 is positioned in proximity to the inner surface of the casing 10. Such formation of the lifter 22 permits it to exhibit pressing force of a predetermined magnitude for a long period of time without causing partial deformation or creep deformation of the disc 16.

Figure 3:
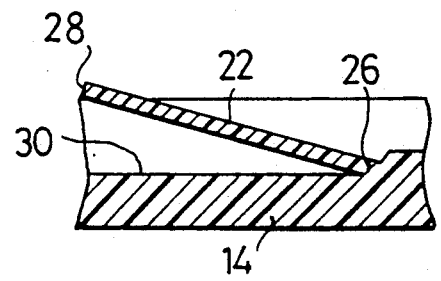
FIG. 3 is a fragmentary enlarged vertical sectional view taken along line III—III of FIG. 1.
Figure 4:
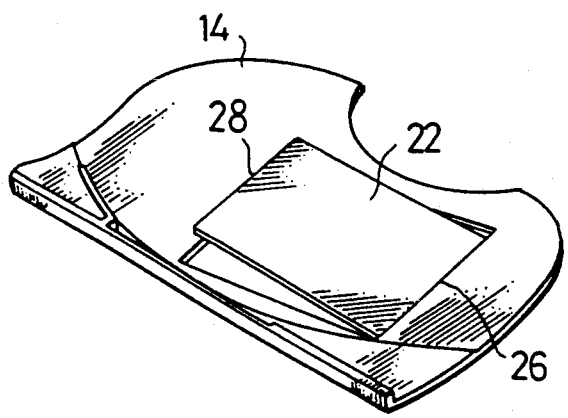
FIG. 4 is a perspective view showing a lifter incorporated in the disc cartridge shown in FIG. 2.
Figure 5:
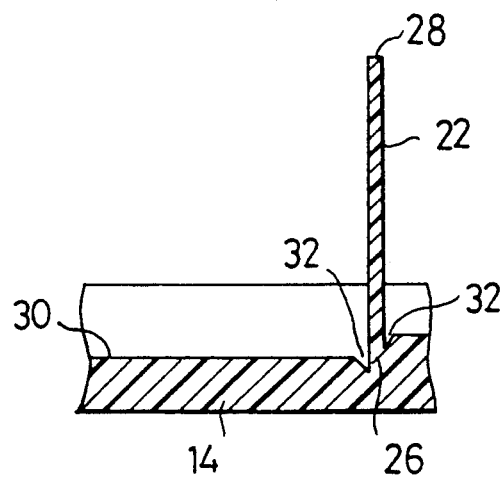
FIG. 5 is a fragmentary vertical sectional view of the lifter shown in FIG. 4 during formation of a casing.
Figure 6:
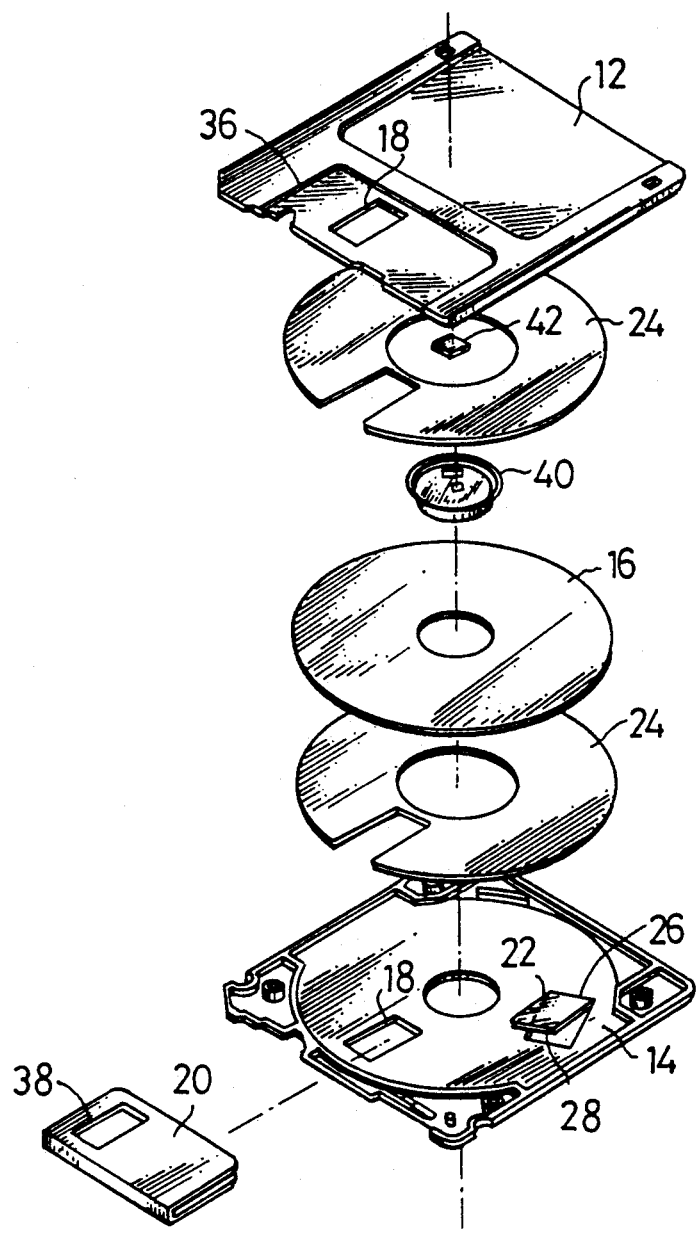
FIG. 6 is an exploded perspective view showing the disc cartridge shown in FIG. 2.

In the illustrated embodiment, it is preferable that the inner surface of the casing 10 is formed thereon with a level different portion 30 in a manner to be recessed from the inner surface of the casing 10 and the proximal end 26 of each of the lifters 22 is mounted on the level different portion 30, as shown in FIGS. 3 and 5. Such construction of the lifter 22 facilitates inclined arrangement of the lifter with respect to the inner surface of the casing 10 while still providing a closed bottom beneath the lifter 22.

Further, the proximal end 26 of each of the lifters 22, as shown in FIG. 5, is preferably formed on at least one of both sides thereof with a V-shaped groove 32 so as to extend in a width direction of the lifter 22. The V-shaped groove 32 thus formed serves as an elastic hinge which permits the lifter 22 to be readily set at a predetermined inclination angle in the post-forming. In the illustrated embodiment, the groove 32 is provided on each of both sides of the lifter 22, however, it may be provided on any one of both sides.

In the drawings, reference numeral 36 designates a recessed portion formed on an outer surface of each of the upper and lower casing members 12 and 14, which serves as a slide area for the shutter 20. Reference numeral 38 is a window formed at tile shutter 20, 40 is a hub, and 42 is a central plate.

In the disc cartridge of tile illustrated embodiment constructed as described above, the disc 16 which is interposedly arranged between tile liners 24 arranged in a pair is kept pressedly contacted with the liners for a long period of time by means of substantially constant elastic force of the lifters 22. Thus, the illustrated embodiment minimizes or substantially prevents local or partial deformation of the disc and ensures safety of the disc while preventing damage to the disc. Thus, the disc cartridge is significantly increased in reliability.

As can be seen from the foregoing, in the disc cartridge of the present invention, tile elastic lifters which are arranged on the inner surface of the tile casing made of a synthetic resin material to act elastic force on the disc medium each are formed integral with the casing and into a plate-like shape in the manner that the proximal end thereof is connected to the casing and the distal end thereof is rendered free. Such construction of the present invention significantly decreases the number of parts, facilitates assembling of tile disc cartridge and attains a decrease in manufacturing cost. Also, the present invention permits pressing force acting on tile disc medium rotating to be kept constant for a long period of time and effectively prevents damage to the disc-like medium, to thereby substantially improve durability and reliability of the disc cartridge. This also prevents disc cleaning and touch of a head with respect to the disc from being deteriorated. Moreover, the present invention substantially prevents deformation of the disc medium which causes damage thereto, and facilitates the manufacturing.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A disc cartridge comprising:
   a casing made of a synthetic resin material;
   a disc medium rotatably arranged in said casing; and
   a lifter means arranged on an inner surface of said casing so as to press said disc medium;
   said lifter means being formed integrally with said casing and into a plate-like shape in such a manner that a proximal end thereof is connected to said casing and a distal end thereof is rendered free, said proximal end being formed with an adjacent V-shaped groove on at least one side of the lifter means.

2. A disc cartridge as defined in claim 1, wherein said lifter means has a width and said V-shaped groove is arranged in a width direction of said lifter means.

3. A disc cartridge as defined in claim 1, wherein a second V-shaped groove is provided on the other side of the lifter means.

4. A disc cartridge housing for rotatably supporting a disc medium comprising:
   a casing made of a synthetic resin material and configured to rotatably support the disc medium; and
   a biasing means, integrally formed with the casing, for pressing the disc medium when installed in the casing, the biasing member including a lifter member integrally connected to the casing at a proximal end and having a distal end cantilevered from the casing, said proximal end being formed with an adjacent V-shaped groove on at least one side of the lifter member.

5. A disc cartridge as defined in claim 4, wherein a second V-shaped groove is provided on the other side of the lifter member.

6. A disc cartridge as defined in claim 4, wherein said casing and lifter means are formed on a polypropylene resin material.

* * * * *